United States Patent
Zernickel et al.

[11] Patent Number: 6,158,896
[45] Date of Patent: Dec. 12, 2000

[54] PLAY-FREE RADIAL BALL BEARING

[75] Inventors: Alexander Zernickel, Herzogenaurach; Rainer Lutz, Markt Erlbach; Herbert Erhart, Herzogenaurach, all of Germany

[73] Assignee: INA Walzlager Schaeffler oHG, Germany

[21] Appl. No.: 09/251,192

[22] Filed: Feb. 16, 1999

[30] Foreign Application Priority Data

Feb. 21, 1998 [DE] Germany .............................. 198 07 514

[51] Int. Cl.⁷ ...................................................... F16C 33/60
[52] U.S. Cl. ............................................... 384/506; 384/517
[58] Field of Search ................................... 384/506, 517, 384/518, 901, 563

[56] References Cited

FOREIGN PATENT DOCUMENTS

| | | |
|---|---|---|
| 00 34 953 A7 | 2/1981 | European Pat. Off. . |
| 02 37 367 B1 | 7/1989 | European Pat. Off. . |
| GM-19 23 755 | 9/1965 | Germany . |
| 78 16 941 U1 | 9/1978 | Germany . |
| OS 23 32 196 | 1/1994 | Germany . |
| 43 93 663 C1 | 2/1994 | Germany . |
| 94 00 766 U1 | 4/1994 | Germany . |
| 44 35 831 A1 | 4/1996 | Germany . |
| 196 04 036 A1 | 8/1996 | Germany . |

*Primary Examiner*—Lenard A. Footland
*Attorney, Agent, or Firm*—Volpe and Koenig, PC

[57] ABSTRACT

A play-free radial ball bearing in which the inner bearing ring is constructed in two parts, whereby at least one of the two bearing ring elements (4, 5) is axially and radially movable and the bearing outer ring (6, 23, 25) has a race (2) with a radius that is clearly larger that the radius of the bearing balls (1). Due to the significantly greater osculation of the outer race (2) in comparison to the bearing balls (1), a restricted tipping of the shaft with, at the same time, freedom from play in the bearing, is made possible in connection with the two part movable inner ring.

9 Claims, 4 Drawing Sheets

PLAY-FREE RADIAL BALL BEARING

BACKGROUND OF THE INVENTION

The invention concerns a play-free radial ball bearing with a two part bearing ring in an axial direction, between which and a concentrically arranged second bearing ring ball bearings roll, whereby at least one of the two bearing ring elements of the two part bearing ring is acted upon by pressure from a spring element in an axial direction so that the ball bearings are maintained under prestress.

A radial ball bearing of this general type is previously known from DE 43 93 663 C1. The outer bearing ring is constructed in two parts, whereby a spring element made of an elastomer provides for the prestressing in the bearing in that it presses the movable outer ring against the bearing and consequently against the second outer ring.

The disadvantage in this arrangement is that with bearings of this type, freedom from play can be impaired when the supported shaft shifts into an inclined position. Hence, it is possible, for example, that spring tension increases too much due to the tipping motion of the shaft, and that the friction factors in the bearing therewith become too great.

SUMMARY OF THE INVENTION

Underlying the invention is therefore the objective of improving a bearing representative of that type such that it functions without impairment even in connection with shaft misalignment.

In accordance with the invention, this objective is accomplished for play-free radial ball bearings having a two part bearing ring in an axial direction, between which and a second bearing ring bearing balls roll and in which at least one of the two bearing ring elements is acted upon by pressure from a spring element in an axial direction so that the bearing balls are held under prestress, in that the inner ring bearing is constructed in two parts, whereby at least one of the two bearing ring elements is axially and radially movable, and the outer bearing ring has a race the radius of which is significantly greater than the radius of the bearing balls.

Due to the clearly greater osculation of the outer race in comparison with the bearing balls acting together with the two part movable inner ring, a restricted tipping of the shaft with simultaneous bearing freedom from play is made possible. This solution is especially suitable for a tipping angle up to 2°.

The osculation, that is the difference in curvature between the bearing balls and the race of the outer bearing ring, is defined as follows:

$$\text{Bending } K = r_{outer\ race}/D_{bearing\ ball} \times 100(\%)$$

In a further development of the invention, the ratio of the radius of the race of the outer bearing ring to the diameter of the bearing balls is greater than 60%. The osculation of a normal grooved ball bearing is about 52–54%.

A further advantageous configuration of a radial ball bearing of the invention provides that the bearing outer ring and the two bearing ring elements are constructed as solid parts, whereby the two bearing ring elements are accommodated by an inner casing shaped without cutting which has radially outwardly directed borders on its ends which enclose a face of the first bearing ring part and a corrugated spring which bears on the second bearing ring part. The non-cutting formed inner casing which can be realized in a simple way with known manufacturing technology provides for a closed unit by accommodating the two bearing ring elements and the corrugated spring.

In another embodiment, an axially extending element of the inner casing is provided with a graduated outside diameter. This graduated outside diameter can be formed without trouble within the non-cutting forming process, and ensures that the bearing inner ring can change its position if an inclined position of the shaft should become necessary, without an action upon the prestressing of the mounting being exerted in an undesirable manner.

Another advantageous embodiment of the invention provides that the radial ball bearing is distinguished by the fact that the bearing outer ring is constructed as a non-cutting, formed part, and that the first bearing ring element is formed by a stiffening segment which on one end passes over into a non-cutting formed inner casing which ends in an edge directed radially outward, between which and the stiffening segment the second bearing ring element, constructed as a solid part, and the corrugated spring are arranged.

This construction has the advantage that a ball race half of the inner ring is an integral component of the inner casing so that a solid part can be dispensed with. In terms of manufactrring technology, such a component comprised of an inner sheath and bearing ring element in one piece can be produced in a simple manner, for example by a deep drawing process.

According to a further feature of the invention the race of the bearing outer ring is formed by a folded stiffening segment. This means that the bearing outer ring is constructed double-walled and can consequently safely accommodate greater pressing forces if, for example, such a bearing is pressed into a housing bore hole. Also, such a folded bearing outer ring can be easily manufactured by a non-cutting procedure.

A further embodiment of the radial ball bearing provides that the bearing outer ring and the first bearing ring element are constructed as a solid part, that the second bearing ring element is formed by an angle ring formed without cutting, whereby the angle ring is pressed by an elastomer spring toward the first bearing ring element and are contained by a non-cutting, formed inner casing which passes over into a border directed radially outwardly on both ends.

The movement of the inner ring required by the swinging process is assured in that a radial gap is formed between the angle ring and the inner casing containing it.

According to an additional feature of the invention, it is provided in this case that the first bearing ring element goes beyond a central perpendicular defined by the ball rim. In this way, a limitation of radial deflection is made possible. That means that the bearing balls can only deviate radially to a limited extent upon swivelling of the bearing axis.

The invention will be explained in greater detail in reference to the embodiments below.

BRIEF DESCRIPTION OF THE DRAWINGS

The foregoing summary, as well as the following detailed description of the invention, will be better understood when read in conjunction with the appended drawings. For the purpose of illustrating the invention, there are shown in the drawings embodiments which are presently preferred. It should be understood, however, that the invention is not limited to the precise arrangements and instrumentalities shown. In the drawings.

DETAILED DESCRIPTION OF THE INVENTION

Figure 1:
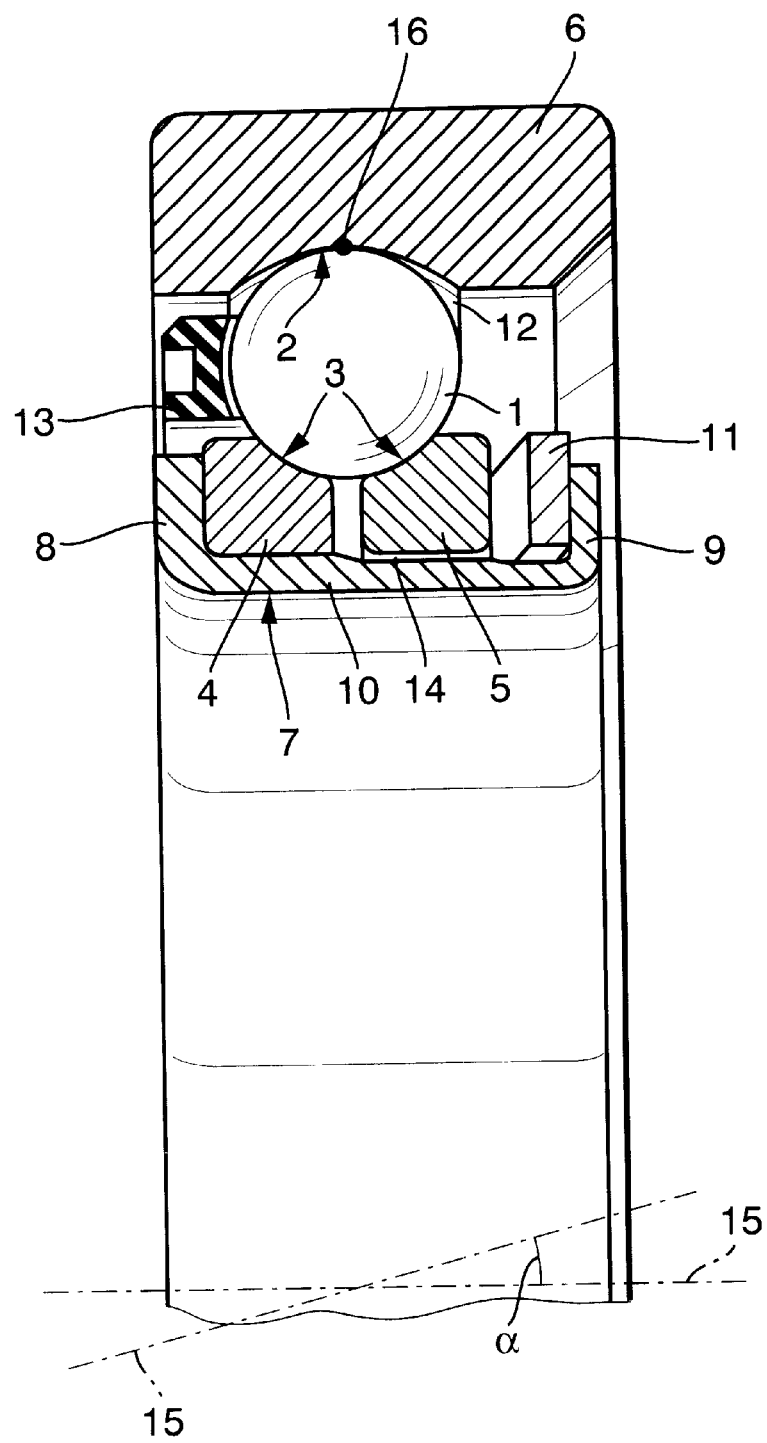
FIG. 1 shows an axial half section of a first embodiment of the play-free radial ball bearing of the invention.

With the play-free radial ball bearing represented in FIG. 1, bearing balls 1 roll guided in a cage 13 on an outer race 2 of a ball groove 12 of a bearing outer ring 6, constructed as a solid part, and on a concentrically arranged inner race 3. The inner race 3 is jointly provided by first and second bearing ring elements 4, 5 which are set at a distance from each other in a radial direction and are located in a non-cutting formed inner casing 7. The inner casing 7 has borders 8 and 9 directed radially outwardly, whereby border 8 encloses the face of the first bearing ring element 4. The other border 9 of casing 7 encloses a corrugated spring which bears on the second bearing ring part in an axial direction. This corrugated spring 11 now provides for the prestressing in the ball bearing in that it presses the movable second bearing ring part 5 against the bearing balls 1 and consequently against the first bearing part 4 and the bearing outer ring 6. It is further understood from FIG. 1 that an axial element 10 of the inner sheath 7 has a graduated or stepped outer diameter so that a radial gap 14 is formed between the axial part 10 and the second movable bearing ring element 5.

The axial section shows that the bearing ball 1 is more sharply curved than the contour of the concave ball groove 12, that is, the radius of the bearing ball 1 is smaller than the radius of the ball groove 12. With a horizontally running bearing axis 15 of the radial ball bearing, the bearing balls 1 will come into contact with races 2 and 3 at three places, that means, a so called three point bearing is formed. The point contact between bearing ball 1 and outer race 2 is provided with reference number 16 in FIG. 1. If the bearing axis 15 is tipped by a small amount, then the contact point 16 on race 2 will wander to the left in the direction of the cage 13, while the radial gap 14 between the axial element 10 and the second bearing ring element 5 is diminished in its size.

Figure 2:
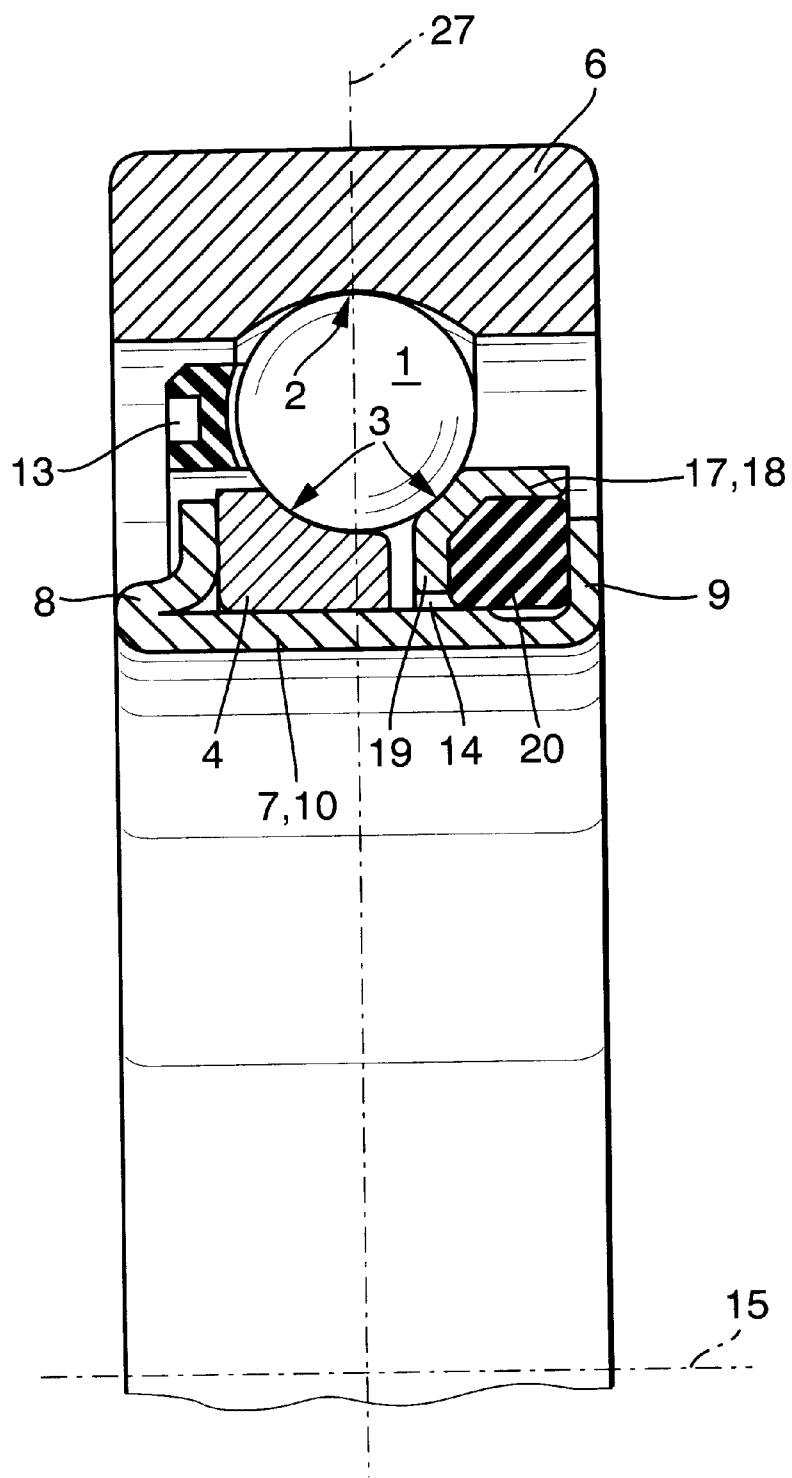
FIG. 2 shows an axial half section of a second embodiment of the play-free radial ball bearing of the invention.

The bearing according to FIG. 2 differs from that shown in FIG. 1 in that the second bearing ring element 5 and the corrugated spring 11 are replaced by an angle ring 17 and an elastomer spring 20. The angle ring 17 has an axially running side part 18 and a radially running side part 19 which form a part of the inner race 3 for the bearing balls 1 at their connected ends. The elastomer spring 20 is enclosed by the angle ring 17 and by the axial element 10, as well as by border 9 of the non-cutting formed inner casing 7, such that once again a radial gap 14 is formed between the cylindrical element 10 and the side part 19. if a tipping motion is now conducted about the angle a in the manner already described, then the radial gap is diminished in its magnitude while the point of contact 16 of the bearing ball 1 and the race 2 moves to the left. It can furthermore be understood from FIG. 2 that the bearing ring element 4 extends in an axial direction over the center of a perpendicular defined through the center of the bearing balls 1 so that the radial deflection is restricted.

Figure 3:
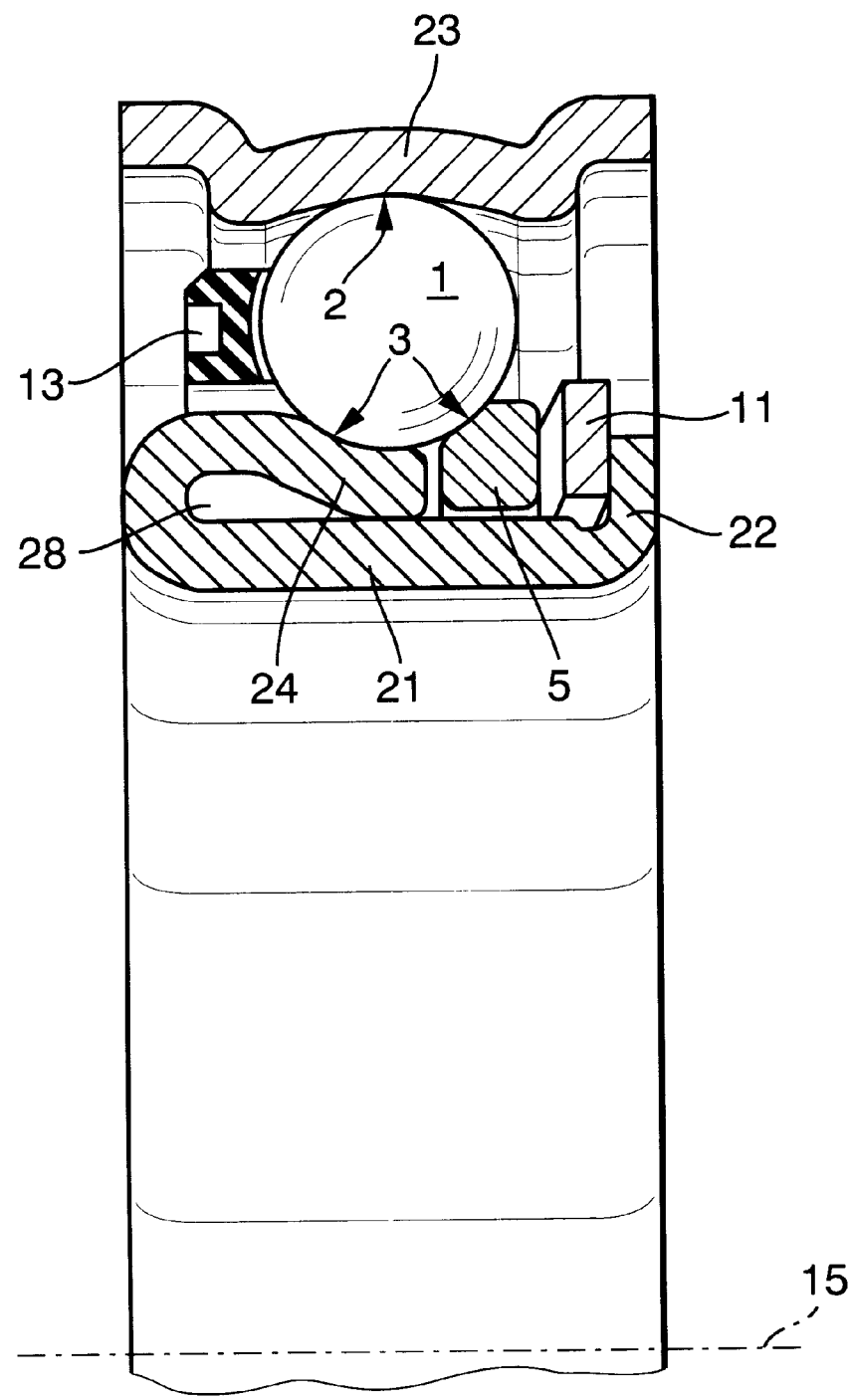
FIG. 3 shows an axial half section of a third embodiment of the play-free radial ball bearing of the invention.
Figure 4:
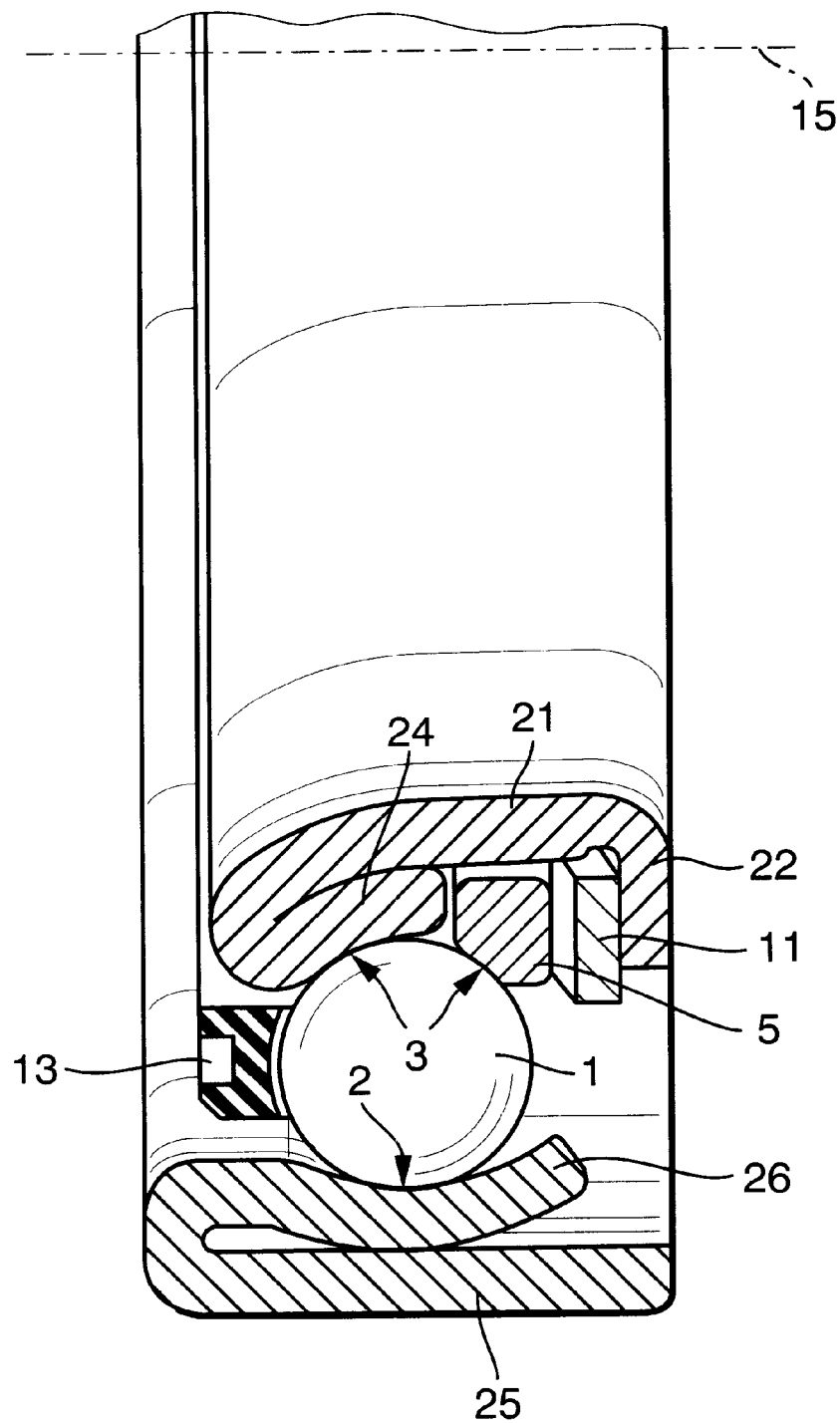
FIG. 4 shows an axial half section of a fourth embodiment of the play-free radial ball bearing of the invention.

The play-free radial ball bearing represented in FIG. 3 has an antler-like, noncutting formed bearing outer ring 23 which forms the outer race 2 for the bearing balls 1. In contrast to the previously described figures, a part of the inner race 3 is formed by a stiffening segment 24 which is a component part of an inner casing 21. This stiffening segment 24 is joined to one end of the inner casing 21 and can be manufactured by a forming process without difficulty. The other part of the inner race 3 is formed in a manner previously described for the bearing ring element 5 to which the corrugated spring 11 is connected and which is enclosed by a border 22 of the inner casing 21. The radial bearing represented in FIG. 4 differs from that shown in FIG. 3 in that on the one hand a non-cutting formed bearing outer ring 25 is provided with a stiffening segment 26, and in that on the other hand no free space 28 (as shown in FIG. 3) is left between stiffening segment 24 and inner casing 21.

The previously described radial ball bearngs can, for example, be advantageously used as steering column bearings in motor vehicles, since despite possible misaliginments, the shaft is provided with the necessary freedom from play. In addition, they can accommodate the necessary high axial and radial forces.

It will be appreciated by those skilled in the art that changes could be made to the embodiments described above without departing from the broad inventive concept thereof. It is understood, therefore, that this invention is not limited to the particular embodiments disclosed, but it is intended to cover modifications within the spirit and scope of the present invention as defined by the appended claims.

Reference Designations

1 Bearingball
2 Outer race
3 Interior race
4 First bearing ring element
5 Second bearing ring element
6 Bearing outer ring
7 Inner casing
8 Border
9 Border
10 Axial part of 7
11 Corrugated spring
12 Ball groove
13 Cage
14 Radial gap
15 Bearing axis
16 Point
17 Angle ring
18 Axial side part of 17
19 Radial side part of 17
20 Elastomer spring
21 Inner casing
22 Border
23 Bearing outer ring
24 Stiffening segment of 21
25 Bearing outer ring
26 Stiffening segment of 25
27 Central perpendicular
28 Free space
α Tipping angle
r Radius of 2 or 12
D Diameter of 1

What is claimed is:

1. Play-free radial ball bearing comprising a two part inner bearing ring having two bearing ring elements (4,5) spaced in an axial direction, a concentrically arranged bearing outer ring and bearing balls (1) located for rolling movement between the two bearing ring elements (4,5) and the bearing outer ring, at least one of the two bearing ring elements (4, 5) of the inner bearing ring being acted upon by pressure from a spring element (11, 20) in an axial direction so that the bearing balls (1) are held under prestress, at least one of the two bearing ring elements (4, 5) is mobile in a radial and an axial direction, and the outer bearing ring (6, 23, 25) has a race (2) with a radius which is much greater than a radius of the bearing balls (1).

2. Play-free radial ball bearing according to claim 1, wherein a ratio of a radius of the race (2) of the bearing outer ring (6, 23, 25) to a diameter of the ball bearings (1) is greater than 60%.

3. Play-free radial ball bearing according to claim 1, wherein the bearing outer ring (6) and the two bearing ring elements (4, 5) are constructed as solid parts, whereby the two bearing ring elements (4, 5) are located within a non-cutting formed inner casing (7) having borders (8, 9) with radially outwardly directed ends which enclose a face of the first bearing ring element (4) and a corrugated spring which bears on the second bearing ring element (5).

4. Play-free radial ball bearing according to claim 3, wherein an axially running element (10) of the inner casing (7) has a graduated outer diameter.

5. Play-free radial ball bearing according to claim 1, wherein the bearing outer ring (23, 25) is constructed as a non-cutting formed part, the first bearing ring element (4) is formed by a stiffening segment (24) which passes over into a non-cutting formed inner casing (21) on one end, the casing ends in a border (22) directed radially outward, and the second bearing ring element (5) which is constructed as a solid part and the corrugated spring (1) are arranged between the border (22) and the stiffening segment (24).

6. Play-free radial ball bearing according to claim 5, wherein the race (2) of the bearing outer ring (25) is formed by a folded stiffening segment (26).

7. Play-free radial ball bearing according to claim 1, wherein the bearing outer ring (6) and the first bearing element (4) are constructed as solid parts, the second bearing ring element (5) is formed by a non-putting formed angle ring (17), and the angle ring (17), an elastomer spring (20) which bears on the angle ring, and the first bearing ring (4) are located in a non-cutting formed inner casing (10) which on both ends transitions into radially outwardly directed borders (8, 9).

8. Play-free radial ball bearing according to claim 7, wherein a radial gap (14) is formed between the angle ring (17) and the inner casing (7).

9. Play-free radial ball bearing according to claim 7, wherein the first bearing ring element (4) passes axially beyond a central perpendicular (27) defined by a ball rim of the bearing balls (1).

\* \* \* \* \*